United States Patent
Xiaoxian et al.

(10) Patent No.: US 9,617,131 B2
(45) Date of Patent: Apr. 11, 2017

(54) SINGLE DRIVE THREE PIVOT FORKLIFT TRUCK

(71) Applicant: Big Lift, LLC, Lombard, IL (US)

(72) Inventors: Yu Xiaoxian, Hangzhou (CN); Xu Linjie, Hangzhou (CN); Li Yang, Hangzhou (CN)

(73) Assignee: BIG LIFT, LLC, Lombard, IL (US)

( * ) Notice: Subject to any disclaimer, the term of this patent is extended or adjusted under 35 U.S.C. 154(b) by 0 days.

(21) Appl. No.: 14/976,305

(22) Filed: Dec. 21, 2015

(65) Prior Publication Data

US 2016/0376134 A1 Dec. 29, 2016

(30) Foreign Application Priority Data

Jun. 24, 2015 (CN) .......................... 2015 1 0358523

(51) Int. Cl.
*B62D 61/06* (2006.01)
*B66F 9/075* (2006.01)
*B62D 5/04* (2006.01)
*B62D 5/02* (2006.01)

(52) U.S. Cl.
CPC ............ *B66F 9/07568* (2013.01); *B62D 5/02* (2013.01); *B62D 5/0418* (2013.01); *B62D 5/0463* (2013.01); *B66F 9/07531* (2013.01); *B66F 9/07572* (2013.01)

(58) Field of Classification Search
CPC ............ B66F 9/07568; B66F 9/07572; B66F 9/07531; B62D 5/0418; B62D 5/02; B62D 5/0463

USPC ....................... 180/216, 443, 444; 701/41, 42
See application file for complete search history.

(56) References Cited

U.S. PATENT DOCUMENTS

| | | | |
|---|---|---|---|
| 4,728,923 A * | 3/1988 | Finger | B62D 15/02 116/31 |
| 2003/0028306 A1* | 2/2003 | Fujimori | B66F 9/07568 701/41 |
| 2004/0098146 A1* | 5/2004 | Katae | B66F 9/24 700/50 |
| 2008/0060860 A1* | 3/2008 | Murase | B60K 1/04 180/65.31 |
| 2008/0060869 A1* | 3/2008 | Murase | B60K 13/04 181/227 |
| 2009/0283346 A1* | 11/2009 | Katae | B60K 1/04 180/68.2 |
| 2011/0060503 A1* | 3/2011 | Futahashi | B62D 6/008 701/41 |
| 2013/0116891 A1* | 5/2013 | Hayama | B66F 9/24 701/42 |
| 2014/0231160 A1* | 8/2014 | Makino | B60K 7/0007 180/65.51 |

(Continued)

*Primary Examiner* — Toan To
(74) *Attorney, Agent, or Firm* — Cook Alex Ltd.

(57) ABSTRACT

A single drive three pivot fork lift truck includes a steering bridge, a steering motor that drives the steering bridge, and at least one rear wheel that is connected to the steering bridge. The forklift truck also includes a first sensor that senses rotational position of a steering wheel, a second sensor that senses rotation of the steering motor, and a controller that receives signals from the first sensor and second sensor and controls the steering motor. The forklift truck also includes a battery carried by the truck frame in a battery compartment located at the rear of the forklift truck, which can take the place of counterweight blocks.

7 Claims, 3 Drawing Sheets

(56) References Cited

U.S. PATENT DOCUMENTS

2015/0014085 A1* 1/2015 Kanna ................. B66F 9/07572
                                                      180/346
2015/0090507 A1* 4/2015 Okada ................. B66F 9/07568
                                                      180/65.51

* cited by examiner

SINGLE DRIVE THREE PIVOT FORKLIFT TRUCK

CROSS-REFERENCE TO RELATED APPLICATION

This application claims priority to Chinese Patent Application No. 201510358523.8, filed Jun. 24, 2015, which is hereby incorporated by reference in its entirety.

FIELD OF THE INVENTION

The disclosure relates to forklift trucks, and more particularly to a single drive three pivot forklift truck.

BACKGROUND

Forklift trucks are industrial vehicles and may be of various wheeled types. Forklift trucks may be used for cargo loading and unloading, stacking and short distance transportation operations. The international standards organization ISO/TC110 refers to them as industrial vehicles, and forklift trucks commonly are used to transport large objects, usually using a motor that includes a fueled engine or a battery drive.

A three pivot forklift truck is a forklift truck that the entire weight of the forklift truck essentially supported by three support points. For example, the three support points may be located at the points of contact with the ground of a pair of spaced apart front wheels, and a third point of contact with the ground may be located at the contact of at least one rear wheel that is at a middle rear position on the forklift truck frame or chassis. Compared to four pivot fork lift trucks, a three pivot forklift truck has similar stability, but more flexibility or maneuverability in steering, especially when turning 360 degrees.

A traditional three pivot forklift truck is driven by dual drive motors, and uses applied hydraulic steering. The hydraulic steering has a pump that is driven by a pump motor to generate hydraulic pressure for the system. The pressure is output to the steering wheel diverter valve. Steering system pressures are determined by the rotational position of an operator steering wheel and are distributed to the horizontal steering master cylinder on a steering bridge. The cylinder on the steering bridge drives directional rotation of the wheels, so as to achieve steering of the forklift truck. However, the existence of the hydraulic steering system pressures causes the steering system to feel heavy or require such effort from an operator that it can easily make an operator tired. In addition, it requires power to maintain the system pressure, which causes large energy losses and consumption. Additionally, a hydraulic steering system has a potential risk for leakage of the hydraulic fluid.

Traditional counterbalanced forklift trucks usually have counterweight blocks inside the forklift truck frame, at the back of truck. Counterweight blocks add to the vehicle weight to offset the same weight relative to the truck's capacity, so as to make the truck be balanced. As such, the counterweight blocks make the truck heavy and reduce the flexibility of the capacity. Traditional forklift trucks usually use a motor that includes a fueled engine or battery to produce power. Forklift trucks with a battery usually locate the battery under the operator's seat, which makes the charging the battery inconvenient and it is not easy to check the charging status, which subjects the batter to less protection and tends to reduce the battery life.

SUMMARY

The disclosure provides a single drive three pivot fork lift truck which can improve over traditional forklift truck operation, convenience, energy consumption, and safety and stability, when compared to using a hydraulic steering system.

In order to solve the above technical problems, the single drive three pivot forklift truck of the present disclosure utilizes the following technical scheme. A single drive three pivot forklift truck comprises a forklift truck frame, a steering bridge connected to the forklift truck frame, at least one rear wheel rotatably connected to the steering bridge, a steering wheel rotatably mounted on the forklift truck frame, a steering gear mounted on the steering bridge, a shaft of a steering motor connected to an input gear that meshes with the steering gear, a first sensor that senses steering wheel rotational position, a second sensor that senses steering motor rotation, and a controller that receives signals from the first sensor and second sensor and controls the steering motor.

The first sensor senses the steering wheel rotational position and provides a first signal, and the controller receives the first signal and controls the steering motor based on that first signal, causing directional rotation of the steering bridge and at least one rear wheel, so as to achieve steering of the forklift truck. Meanwhile, the second sensor senses the steering motor rotation and provides a second signal, and the controller receives the second signal and can use the second signal to help control the steering motor rotation, to ensure accuracy and stability of the steering. In this way, the system is able to eliminate some of the parts that otherwise are needed with a hydraulic power steering system, such as a steering diverter valve, a steering master cylinder, and other hydraulic parts, which saves the cost of the parts, lowers the forklift truck weight, and avoids the risk of leakage of hydraulic fluid. In addition, the steering becomes much more accurate and there is a reduction in steering delay, while saving energy, and thereby extending the potential hours of operation. Also, it has the advantage of providing easier and more comfortable operation by presenting less resistance to steering wheel rotation, which permits an operator to work longer, with less fatigue.

In the preferred example, a battery is installed at the rear of the forklift truck, which applies the force of the battery's weight on the rear of the forklift truck, taking the place of the counterweight blocks used to balance the weight in traditional forklift trucks. In this way, the battery placement saves the cost of the counterweight blocks and reduces the overall truck weight, further improving capacity.

In the preferred example, the first sensor is located under the steering wheel, and the second sensor is located at the end of the steering motor. It should be noted that sensor locations can make the detection or measurement by the sensors more accurate, which helps ensure the steering accuracy.

Also included in the preferred example is the connection of the rear wheels and the steering gear to the steering bridge with bolts. Further, the preferred example includes drive axle or transaxle, a gear box, a traction motor, and a pair of front wheels that are rotatably connected to the opposed ends of the drive axle. The gear box also is connected to the drive axle, and the traction motor causes rotation through the gear box and drive axle so as to drive the front wheels. The controller is connected to the traction motor by cables and it controls the traction motor to cause it to rotate. In addition, the traction motor is connected to the gear box with bolts, and the gear box is connected to the middle of drive axle. With a bolted connection, assembly of the gear box and traction motor becomes very convenient, and facilitates maintenance of the forklift truck. A battery is carried by the forklift truck frame and is connected to the controller to provide power to the controller. In comparison to an external power supply, this arrangement is much more convenient and easier to work with.

In the preferred example, a battery compartment is located at the rear of the forklift truck frame, and the battery compartment further includes and is defined by a base plate, a U-shaped coaming plate connected to the base plate and a rear wall of the forklift truck frame. A battery is installed inside the battery compartment and there is a cover positioned on the top of the battery compartment.

With the battery installed in the battery compartment and a cover on the top, the appearance will not be affected but the battery will be well protected. To access the battery, the cover simply needs to be opened and the charging status can be checked directly, which improves convenience when dealing with the battery. In the preferred example, the cover is connected to the forklift truck frame by a hinge, which also makes the opening and closing of the battery compartment cover very convenient.

The disclosure provides the advantageous technical effect by adopting the above technical scheme, wherein the power steering system includes at least one sensor and a controller which can control the steering of the forklift truck, which realizes the power steering of the forklift truck and has the advantages of high steering accuracy, vehicle stability, lower weight of the forklift truck, a low likelihood of safety hazards, easy operation, longer operation time of the forklift truck, improved operator comfort, less operator fatigue, and reduced steering delay. Also, by locating the battery compartment at the rear of the forklift truck frame, the battery can serve the purpose of counterweight blocks, so as to realize a lighter forklift truck weight.

Figure 1:
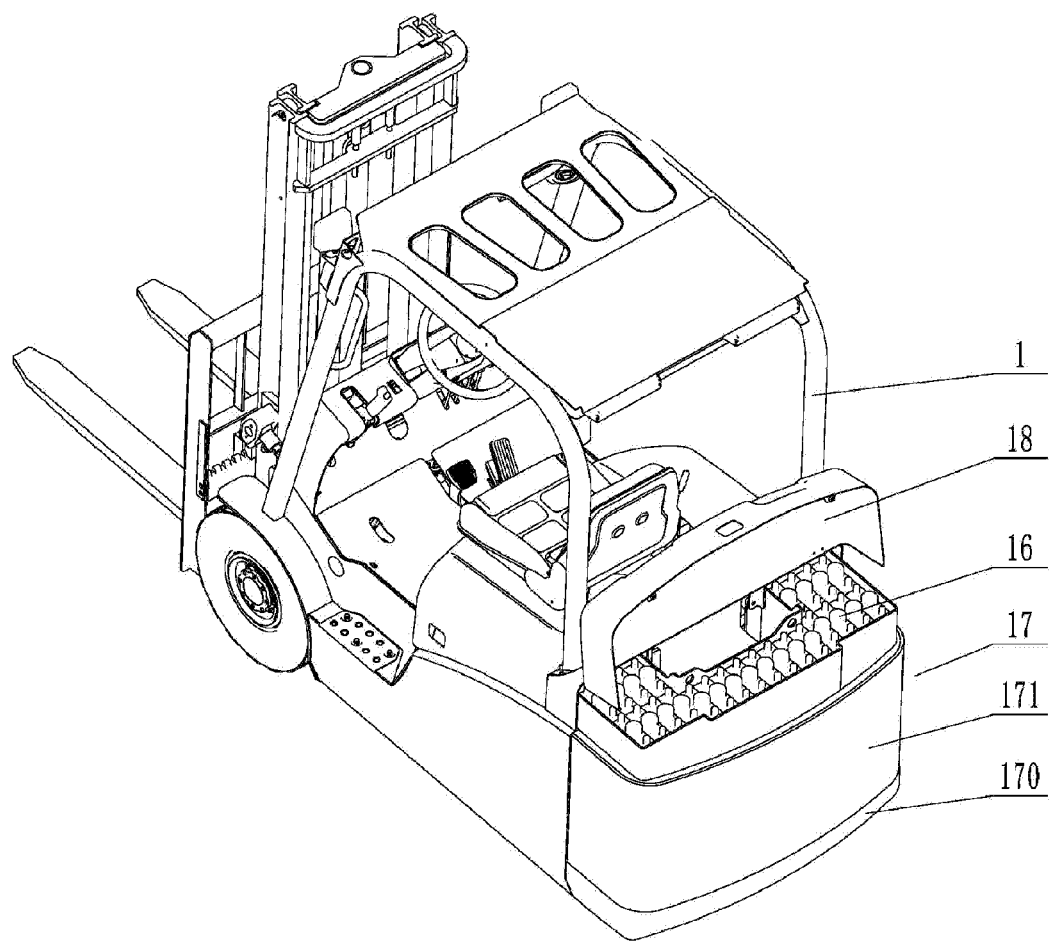
FIG. 1 is an upper perspective view of the forklift truck of the present invention with the battery compartment cover shown in an open position.

The components in the drawings are referred to as follows: forklift truck frame 1, steering bridge 2, rear wheels 3, steering motor 4, steering gear 5, input gear 6, first sensor 7, second sensor 8, controller 9, steering wheel 11, drive axle 12, gear box 13, traction motor 14, front wheels 15, battery 16, battery compartment 17, battery compartment cover 18, base plate 170, and U-shaped coaming plate 171. A further detailed description of the drawings and examples is presented below.

DETAILED DESCRIPTION OF THE PREFERRED EMBODIMENT

Figure 2:
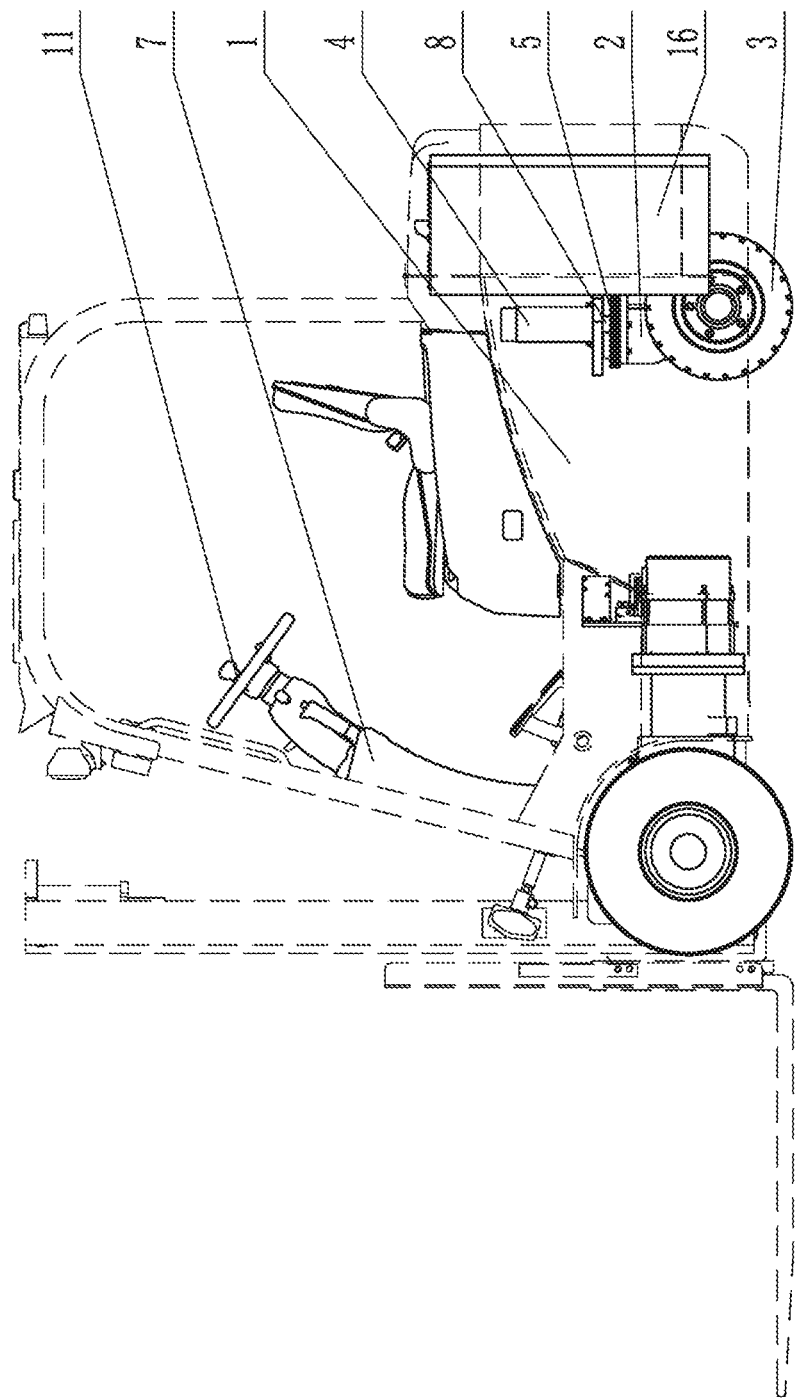
FIG. 2 is a schematic side view of the forklift truck of FIG. 1.
Figure 3:
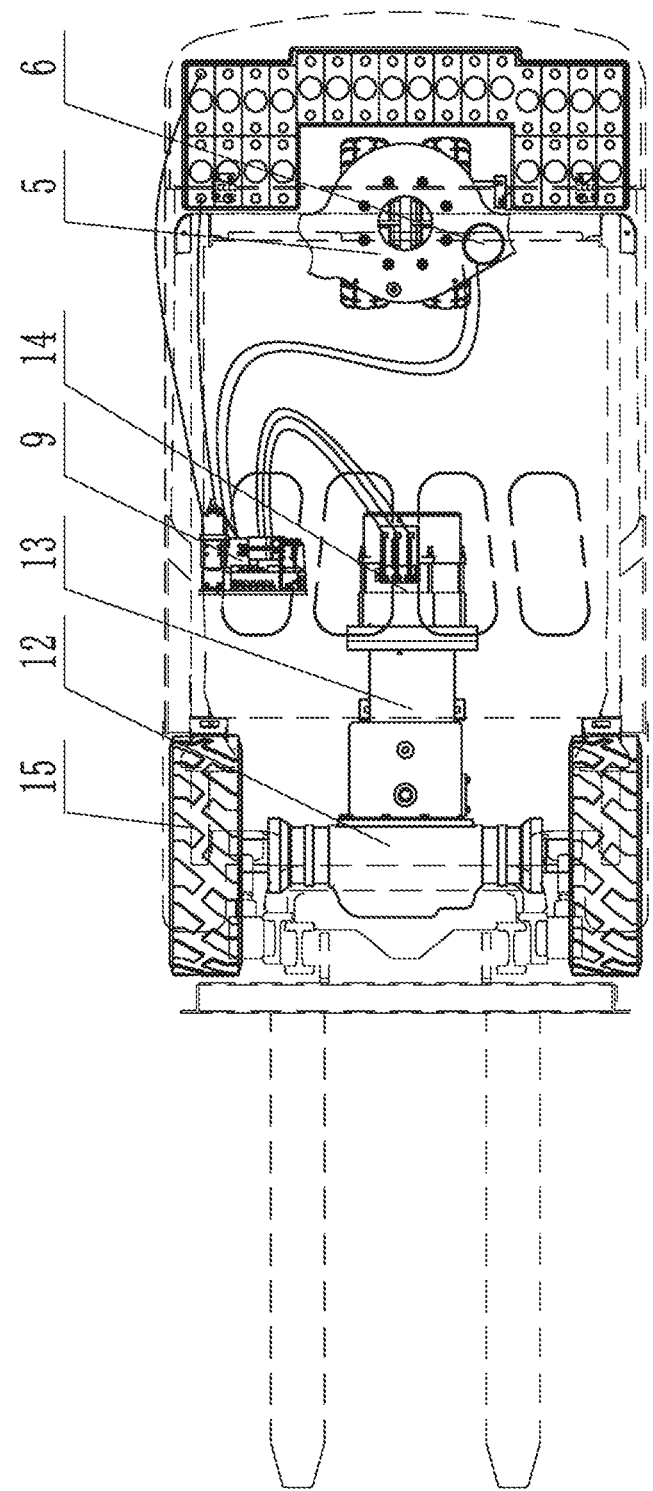
FIG. 3 is a schematic top view of the forklift truck of FIG. 1.

A single drive three pivot fork lift truck is shown in FIGS. 1-3, and includes a forklift truck frame 1, a steering bridge 2 connected to the forklift truck frame, and at least one rear wheel 3 rotatably connected to the steering bridge 2. A steering wheel 11 is rotatably mounted on the forklift truck frame 1, a steering gear 5 is mounted on the steering bridge 2, and a shaft of the steering motor 4 is connected to an input gear 6 that meshes with the steering gear 5. Also included are a first sensor 7 that senses the rotational position of the steering wheel 11, a second sensor 8 that senses rotation of the steering motor 4, and a controller 9 that receives signals from the first sensor 7 and second sensor 8 and controls the steering motor 4. In this example, the first sensor 7 preferably is located under the steering wheel 11, and the second sensor 8 is located at an end of the steering motor 4.

The forklift truck further includes a drive axle 12, a gear box 13, a traction motor 14 and front wheels 15 rotatably connected to opposed ends of the drive axle 12. The gear box 13 is connected to the drive axle 12, and the traction motor 14 is connected to the gear box 13 with bolts, and causes rotation through the gear box 13 and drive axle 12 to drive the front wheels. The controller 9 and traction motor 14 are connected by cables, and controller 9 controls rotation of the traction motor 14.

A battery 16 is carried by the forklift truck frame 1 and is connected to and provides power to the controller 9. The battery 16 provides power to the controller 9, and the controller 9 controls the rotation of the traction motor 14. In turn, the traction motor 14 causes rotation through the gear box 13, which causes rotation through the drive axle 12, which rotatably drives the front wheels 15, so as to realize forklift truck forward and rearward driving, while the rear wheels 3 of the present example are not drive wheels.

When the steering wheel 11 is being rotated, the first sensor 7 that senses rotational position of the steering wheel 11 sends a signal to the controller 9. The controller 9 receives the signal from the first sensor 7 and controls rotation of the steering motor 4, which causes rotation of the input gear 6, and in turn the input gear 6 meshes with and causes rotation of the steering gear 5. This causes directional rotation of the steering bridge 2 and the rear wheels 3 rotatably connected to thereto, to achieve the purpose of steering. In addition, with rotation of the steering motor 4, the second sensor 8 starts to detect rotation of the steering motor 4, and may detect the steering motor speed, angle and/or other attributes, and transmits signals for such detected attributes to the controller 9. The controller 9 also controls the traction motor 14 according to the signals received from the second sensor 8, and uses the signals to make the steering more accurate and more stable.

As shown in FIG. 1, there is a battery 16, and a battery compartment 17 at the rear of the forklift truck frame 1. The battery compartment 17 includes a base plate 170 and a U-shaped coaming plate 171, which is connected to the base plate 170. The base plate 170, U-shaped coaming plate 171 and a rear wall of the forklift truck frame 1 constitute or define the battery compartment 17. The battery 16 is installed inside the battery compartment 17 and there is a cover 18 positioned on top of the battery compartment 17. The cover 18 is connected to the rear of the forklift truck frame 1 by a hinge, which makes the opening and closing very convenient. Because the battery 16 is installed in the battery compartment 17, and there is a cover 18 on the top of the battery compartment 17, the appearance is not affected and the battery 16 is well protected. When using the battery 16, an operator may simply open the cover 18 and can conveniently check the charging status of the battery 16 directly. With the battery 16 installed at the rear of the forklift truck frame 1, the battery 16 places its weight on the rear, and effectively takes the place of counterweight blocks in traditional forklift trucks. In this way, the design advantageously saves the cost of counterweight blocks and reduces the weight of the truck.

It will be understood that the above example presents a preferred embodiment, but the patent is entitled to a range of equivalents and is directed to embodiments that may include modifications, as long as they fall within the coverage of the claims.

The invention claimed is:

1. A single drive three pivot forklift truck comprising: a forklift truck frame, a steering bridge connected to the forklift truck frame, at least one rear wheel rotatably connected to the steering bridge, a steering wheel rotatably mounted on the forklift truck frame, a steering gear mounted on the steering bridge, a shaft of a steering motor connected to an input gear that meshes with the steering gear, a first sensor that senses steering wheel rotational position, a second sensor that senses steering motor rotation, a controller that receives signals from the first sensor and second sensor and controls the steering motor, a battery carried at the rear of the forklift truck frame, a drive axle, a gear box, a traction motor, and front wheels that are connected to opposed ends of the drive axle, and the gear box being connected to the drive axle, wherein the traction motor causes rotation through the gear box and drive axle so as to drive the front wheels, and the controller is connected to the traction motor with cables and controls rotation of the traction motor.

2. The single drive three pivot forklift truck according to claim 1, further comprising a battery compartment at the rear of the forklift truck frame, wherein the battery compartment further comprises and is defined by a base plate, a U-shaped coaming plate connected to the base plate and a rear wall of the forklift truck frame, and wherein the battery is installed inside the battery compartment and a cover is positioned on top of the battery compartment.

3. The single drive three pivot forklift truck according to claim 2, wherein the cover is connected to the forklift truck frame by a hinge.

4. The single drive three pivot forklift truck according to claim 1, wherein the first sensor is located under the steering wheel, and the second sensor is located at the end of the steering motor.

5. A single drive three pivot forklift truck comprising: a forklift truck frame, a steering bridge connected to the forklift truck frame, at least one rear wheel rotatably connected to the steering bridge, a steering wheel rotatably mounted on the forklift truck frame, a steering gear mounted on the steering bridge, a shaft of a steering motor connected to an input gear that meshes with the steering gear, a first sensor that senses steering wheel rotational position, a second sensor that senses steering motor rotation, a controller that receives signals from the first sensor and second sensor and controls the steering motor, a battery compartment at the rear of the forklift truck frame, wherein the battery compartment further comprises and is defined by a base plate, a U-shaped coaming plate connected to the base plate and a rear wall of the forklift truck frame, and wherein the battery is installed inside the battery compartment and a cover is positioned on top of the battery compartment.

6. The single drive three pivot forklift truck according to claim 5, wherein the cover is connected to the forklift truck frame by a hinge.

7. The single drive three pivot forklift truck according to claim 5, wherein the first sensor is located under the steering wheel, and the second sensor is located at the end of the steering motor.

* * * * *